(12) United States Patent
Crosby et al.

(10) Patent No.: US 8,852,694 B2
(45) Date of Patent: Oct. 7, 2014

(54) ARTICLES INCLUDING SURFACE MICROFEATURES AND METHODS FOR FORMING SAME

(75) Inventors: Alfred J. Crosby, Amherst, MA (US); Dinesh Chandra, Akron, OH (US); Anuj Seth, Marlborough, MA (US); Michael A. Zimmerman, North Andover, MA (US)

(73) Assignees: Saint-Gobain Abrasives, Inc., Worcester, MA (US); Saint-Gobain Abrasifs, Conflans-Sainte-Honorine (FR); University of Massachusettes, Boston, MA (US)

( * ) Notice: Subject to any disclaimer, the term of this patent is extended or adjusted under 35 U.S.C. 154(b) by 100 days.

(21) Appl. No.: 13/306,962

(22) Filed: Nov. 29, 2011

(65) Prior Publication Data

US 2012/0141733 A1 Jun. 7, 2012

Related U.S. Application Data

(60) Provisional application No. 61/417,750, filed on Nov. 29, 2010.

(51) Int. Cl.
| | | |
|---|---|---|
| *C08F 2/48* | (2006.01) | |
| *B05D 5/06* | (2006.01) | |
| *B05D 5/02* | (2006.01) | |
| *C03C 17/30* | (2006.01) | |
| *C03C 17/32* | (2006.01) | |
| *B05D 3/04* | (2006.01) | |
| *B05D 1/42* | (2006.01) | |
| *B05D 3/06* | (2006.01) | |

(52) U.S. Cl.
CPC *B05D 5/02* (2013.01); *B05D 5/061* (2013.01); *B05D 3/0486* (2013.01); *B05D 1/42* (2013.01); *C03C 2217/77* (2013.01); *B05D 3/067* (2013.01); *C03C 17/30* (2013.01); *C03C 17/32* (2013.01)
USPC .............................. 427/508; 427/510; 427/517

(58) Field of Classification Search
CPC ...... B05D 3/0486; B05D 3/061; B05D 3/067; B05D 5/02; B05D 5/061; C03C 17/30; C03C 2217/77
USPC ......................................... 427/508, 510, 517
See application file for complete search history.

(56) References Cited

U.S. PATENT DOCUMENTS

| 4,048,036 A | * | 9/1977 | Prucnal ............................. 522/8 |
| 4,289,798 A | * | 9/1981 | Bagley et al. ................. 427/493 |

(Continued)

FOREIGN PATENT DOCUMENTS

| EP | 0662378 A1 | 7/1995 |
| JP | 56144775 | 11/1981 |

(Continued)

OTHER PUBLICATIONS

Chan, Edwin P. et al, "Surface Wrinkles for Smart Adhesion", Advanced Materials, 2008, 20, 711-716.

(Continued)

*Primary Examiner* — Elena T Lightfoot
(74) *Attorney, Agent, or Firm* — Joseph P. Sullivan; Abel Law Group, LLP

(57) ABSTRACT

A method of forming a polymer film includes dispensing a substrate and coating the substrate with a composition that is curable using actinic radiation. In an example, the method further includes exposing the composition to actinic radiation in presence of an atmosphere including 1 vol % to 37 vol % oxygen, whereby the surface of the composition forms an undulating morphology. In another example, the method further includes applying an oxygen-containing overlay over the composition, exposing the composition to actinic radiation through the oxygen-containing overlay, and removing the oxygen-containing overlay, whereby the surface of the composition forms an undulating morphology.

12 Claims, 8 Drawing Sheets

(56) References Cited

U.S. PATENT DOCUMENTS

| | | | |
|---|---|---|---|
| 4,303,695 A | | 12/1981 | McCann et al. |
| 4,411,931 A | * | 10/1983 | Duong .......................... 427/492 |
| 4,439,480 A | | 3/1984 | Sachs et al. |
| 4,970,904 A | * | 11/1990 | Knotts ....................... 73/863.86 |
| 5,585,415 A | * | 12/1996 | Gorzalski et al. ............... 522/18 |
| 2005/0062410 A1 | | 3/2005 | Bell et al. |
| 2007/0153394 A1 | | 7/2007 | Soyama |

FOREIGN PATENT DOCUMENTS

| | | |
|---|---|---|
| WO | 2009100023 A2 | 8/2009 |
| WO | 2009141726 A2 | 11/2009 |

OTHER PUBLICATIONS

Khare, K. et al, "Tunable Open-Channel Microfluids on Soft Poly(dimethylsiloxane) (PDMS) Substrates with Sinusoidal Grooves", Langmuir, 2009, 3:25(21), 12794-9 (Abstract).
Kim, Dae-Hyeong et al, "Stretchable Electronics: Materials Strategies and Devices", Advanced Materials, 2008, 20, 4887-4892.
Chan, Edwin P. et al, "Fabricating Microlens Arrays by Surface Wrinkling", Advanced Materials, 2006, 5 pages.
Chandra, Dinesh et al, "Strain Responsive Concave and Convex Microlens Arrays", Applied Physics Letters, 2007, 91, 251912, 3 pages.
Bowden, Ned et al, "The Controlled Formation of Ordered, Sinusoidal Structures by Plasma Oxidation of an Elastomeric Polymer", Applied Physics Letters, 1999, 75, 17, 2557-2559.
Kim, J. et al, "Dynamic Display of Biomolecular Patterns Through an Elastic Creasing Instability of Stimuli-Responsive Hydrogels", Nature Materials, 2010, 159-164 (Abstract).
Stafford, Christopher M. et al, "A Buckling-Based Metrology for Measuring the Elastic Moduli of Polymeric Thin Films", Nature Materials, 2004, 3, 545-550.
Genzer, Jan et al, "Soft Matter with Hard Skin: From Skin Wrinkles to Templating and Material Characterization", Soft Matter, 2006, 2, 310-323.
Obrien, Allison K. et al, "Modeling the Effect of Oxygen on Photopolymerization Kinetics", Macromol. Theory Simul., 2006, 15, 176-182.
Basu, Soumendra K. et al, "Mechanism of Wrinkle Formation in Curing Coatings", Progress in Organic Coatings, 2005, 53, 1-16.
Tanaka, Toyoichi et al, "Mechanical Instability of Gels at the Phase Transition", Nature, 1987, 325, 26, 796-798.
Cerda, E. et al, "Geometry and Physics of Wrinkling", Physical Review Letters, 2003, 90, 7, 074302-1-074302-4.
Dendukuri, Dhananjay et al, Modleing of Oxygen-Inhibited Free Radical Photopolymerization in a PDMS Microfluidic Device, Macromolecules, 2008, 41(22), 8547-8556.
Chandra, Dinesh et al, "Self-Wrinking of UV-Cured Polymer Films", Advanced Materials, 2011, 23, 3441-3445.
PCT/US2011/062481, PCT International Search Report mailed Jul. 30, 2012, 2 pages.

* cited by examiner

US 8,852,694 B2

ARTICLES INCLUDING SURFACE MICROFEATURES AND METHODS FOR FORMING SAME

CROSS-REFERENCE TO RELATED APPLICATION(S)

The present application claims priority from U.S. Provisional Patent Application No. 61/417,750, filed Nov. 29, 2010, entitled "ARTICLES INCLUDING SURFACE MICROFEATURES AND METHODS FOR FORMING SAME," naming inventors Alfred J. Crosby, Dinesh Chandra, Anuj Seth, and Michael A. Zimmermann, which application is incorporated by reference herein in its entirety.

FIELD OF THE DISCLOSURE

This disclosure, in general, relates to articles including surface microfeatures and methods of forming such surface microfeatures.

BACKGROUND

Previously, industry sought to form polymeric constructions with surfaces free of defects and variations. Problems relating to consistency within the construction, efficiencies of manufacture, and compositional issues dominated research efforts.

More recently, industries, such as the adhesive, microfluidics, flexible electronics, or optics industries, have recognized potential value in surface microstructures and, as such, have turned to researching methods of forming surface structures of scale on the order of micrometer and smaller.

However, previous attempts to form such microstructures involve multi-step processes that are difficult to perform consistently and involve considerable fabrication cost.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

In an exemplary embodiment, an article includes a polymer layer forming a surface having microfeatures. The microfeatures include undulations separated peak-to-peak by an average wavelength ($\lambda$) in a range of 25 micrometers to 500 micrometers. The undulations have an average amplitude (A) of 1 micrometer to 60 micrometers or a relative amplitude, defined as the ratio of the amplitude to the polymer layer thickness, in a range of 0.1 to 0.5. The polymer layer can be formed of a polymer curable through exposure to actinic radiation, such as ultraviolet radiation. An exemplary polymer includes a free-radical curable polymer, such as an acrylate polymer.

In another exemplary embodiment, a method includes coating a substrate with a composition that includes a polymer precursor curable through exposure to actinic radiation, such as ultraviolet radiation. The method further includes curing the composition through exposure to actinic radiation in the presence of oxygen. In one example, the composition is cured in the presence of an oxygen containing atmosphere, for example, including 1 vol % to 37 vol % oxygen. In another example, the composition is cured when in contact with an oxygen-containing overlay, for example, including a porous elastomer with dissolved oxygen. In either example, the composition cures to form a polymer layer having microfeatures, such as undulations having the wavelength or amplitude described above.

Optionally, a patterned barrier layer can be disposed between the composition and the oxygen source prior to curing. The patterned barrier layer can prevent oxygen transfer to portions of the surface of the composition, resulting upon curing in portions that are smoother than other portions that are exposed to oxygen. The portions exposed to oxygen include microfeatures, such as the above-described undulations.

Figure 1:
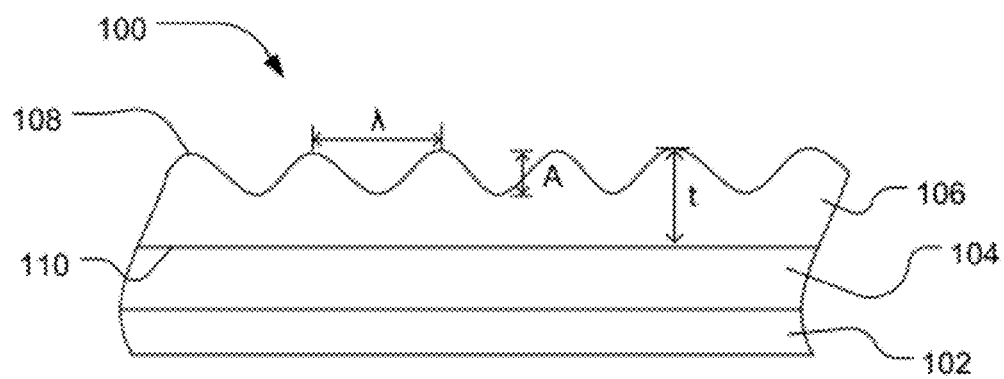
FIG. 1 includes an illustration of an exemplary article.

In a particular embodiment illustrated in FIG. 1, an article 100 includes a substrate 102 and a polymer layer 106 on the substrate 102. The polymer layer 106 can be in direct contact with the substrate 102 without intervening layers. Alternatively, as illustrated, the article 100 can include one or more intermediate layers 104 disposed between the substrate 102 and the polymer layer 106.

The substrate 102 can be flexible or rigid. An exemplary flexible backing includes a polymeric film (including primed films), such as a polyolefin film (e.g., polypropylene including biaxially oriented polypropylene), a polyester film (e.g., polyethylene terephthalate), a polyamide film, or a polyimide film; a cellulose ester film; a metal foil; a mesh; a foam (e.g., natural sponge material or polyurethane foam); a cloth (e.g., cloth made from fibers or yarns comprising polyester, nylon, silk, cotton, poly-cotton or rayon); a paper; a vulcanized paper; a vulcanized rubber; a vulcanized fiber; a nonwoven material; or any combination thereof; or any treated version thereof. A cloth substrate can be woven or stitch bonded. In particular examples, the substrate 102 is selected from a group consisting of paper, polymer film, cloth, metal foil or any combination thereof. In other examples, the substrate 102 includes a film, such as a polypropylene film, polyethylene terephthalate (PET) film, a polyimide film, or any combination thereof.

The substrate 102 can optionally have at least one of a saturant, a presize layer or a backsize layer. The purpose of such layers is typically to seal the substrate 102 or to protect yarn or fibers in the substrate 102. If the substrate 102 is a cloth material, at least one of these layers can be used. The addition of the presize layer or backsize layer can additionally result in a smoother surface on either the front or the back side of the substrate 102.

In a particular example, the substrate 102 can be a carrier layer on which the polymer layer 106 is formed. The polymer layer 106 or optional intermediate layers 104 can be separated from the substrate 102. In another example, the substrate 102 can be an integral part of the article 100, remaining with the polymer layer 106.

When the substrate 102 forms a carrier layer, the optional intermediate layer 104 can include a melt adhesive or pressure sensitive adhesive layer. An exemplary pressure-sensitive adhesive includes latex crepe, rosin, acrylic polymer or copolymer including polyacrylate ester (e.g., poly(butyl acrylate)), vinyl ether (e.g., poly(vinyl n-butyl ether)), alkyd adhesive, rubber adhesive (e.g., natural rubber, synthetic rubber, and chlorinated rubber), or a mixture thereof.

In another example, the intermediate layer 104 includes an encapsulant material, such a polymer selected from polyolefin, a copolymer of ethylene and vinyl acetate, vinyl acetate copolymer, acrylate copolymer, functionalized polyolefin, polyurethane, polyvinyl butyral, silicone, fluoropolymer, or any combination thereof. An exemplary polymer includes natural or synthetic polymers, including polyethylene (including linear low density polyethylene, low density polyethylene, high density polyethylene, etc.); polypropylene; nylons (polyamides); EPDM; polyesters; polycarbonates; ethylene-propylene copolymers; copolymers of ethylene or propylene with acrylic or methacrylic acids; acrylates; methacrylates; poly alpha olefin melt adhesives such including, for example, ethylene vinyl acetate (EVA), ethylene butyl acrylate (EBA), ethylene methyl acrylate (EMA), ionomers (e.g., acid functionalized polyolefins generally neutralized as a metal salt), or acid functionalized polyolefins; polyurethanes including, for example, thermoplastic polyurethane (TPU); olefin elastomers; olefinic block copolymers; thermoplastic silicones; polyvinyl butyral; a fluoropolymer, such as a terpolymer of tetrafluoroethylene, hexafluoropropylene, and vinylidene fluoride (THV); or any combination thereof.

The polymer layer 106 includes polymeric materials and is formed from a composition that can be cured through exposure to radiation, such as using X-ray radiation, gamma radiation, ultraviolet radiation, visible light radiation, electron beam (e-beam) radiation, or any combination thereof. Ultraviolet (UV) radiation can include radiation at a wavelength or a plurality of wavelengths in the range of from 170 nm to 400 nm, such as in the range of 250 nm to 380 nm. Ionizing radiation includes high-energy radiation capable of generating ions and includes electron beam (e-beam) radiation, gamma radiation, and x-ray radiation. In a particular example, e-beam ionizing radiation includes an electron beam generated by a Van de Graaff generator, an electron-accelerator, or an x-ray. In a particular example, the polymeric material is curable through actinic radiation, such as visible light radiation or ultraviolet radiation. For example, the polymeric material can be cured through exposure to ultraviolet radiation.

An exemplary polymeric material can include a (meth) acrylate, an isocyanate with acrylate functionality, an insocyanurate with acrylate functionality, a silicone, a diene elastomer, an epoxy, an oxetane, or any combination thereof. In particular, the polymeric material is curable through a free radical curing mechanism, referred to herein as free-radical curable. In an example, a free-radical curable component has one or more ethylenically unsaturated groups, such as (meth) acrylate (i.e., acrylate or methacrylate) functional components or functionality resulting from diene monomers.

An example of a monofunctional ethylenically unsaturated component includes acrylamide, N,N-dimethylacrylamide, (meth)acryloylmorpholine, 7-amino-3,7-dimethyloctyl (meth)acrylate, isobutoxymethyl(meth)acrylamide, isobornyloxyethyl (meth)acrylate, isobornyl (meth)acrylate, 2-ethylhexyl (meth)acrylate, ethyldiethylene glycol (meth) acrylate, t-octyl (meth)acrylamide, diacetone (meth)acrylamide, dimethylaminoethyl (meth)acrylate, diethylaminoethyl (meth)acrylate, lauryl (meth)acrylate, dicyclopentadiene (meth)acrylate, dicyclopentenyloxyethyl (meth)acrylate, dicyclopentenyl (meth)acrylate, N,N-dimethyl(meth)acrylamidetetrachlorophenyl (meth)acrylate, 2-tetrachlorophenoxyethyl (meth)acrylate, tetrahydrofurfuryl (meth)acrylate, tetrabromophenyl (meth)acrylate, 2-tetrabromophenoxyethyl (meth)acrylate, 2-trichlorophenoxyethyl (meth)acrylate, tribromophenyl (meth)acrylate, 2-tribromophenoxyethyl (meth)acrylate, 2-hydroxyethyl (meth)acrylate, 2-hydroxypropyl (meth)acrylate, vinylcaprolactam, N-vinylpyrrolidone, phenoxyethyl (meth)acrylate, butoxyethyl (meth)acrylate, pentachlorophenyl (meth)acrylate, pentabromophenyl (meth)acrylate, polyethylene glycol mono(meth) acrylate, polypropylene glycol mono(meth)acrylate, bornyl (meth)acrylate, methyltriethylene diglycol (meth)acrylate, or any combination thereof.

An examples of the polyfunctional ethylenically unsaturated component includes ethylene glycol di(meth)acrylate, dicyclopentenyl di(meth)acrylate, triethylene glycol diacrylate, tetraethylene glycol di(meth)acrylate, tricyclodecanediyldimethylene di(meth)acrylate, trimethylolpropane tri(meth)acrylate, ethoxylated trimethylolpropane tri(meth) acrylate, propoxylated trimethylolpropane tri(meth)acrylate, tripropylene glycol di(meth)acrylate, neopentyl glycol di(meth)acrylate, both-terminal (meth)acrylic acid adduct of bisphenol A diglycidyl ether, 1,4-butanediol di(meth)acrylate, 1,6-hexanediol di(meth)acrylate, polyethylene glycol di(meth)acrylate, (meth)acrylate-functional pentaerythritol derivatives (e.g., pentaerythritol tri(meth)acrylate, pentaerythritol tetra(meth)acrylate, dipentaerythritol hexa(meth) acrylate, dipentaerythritol penta(meth)acrylate, or dipentaerythritol tetra(meth)acrylate), ditrimethylolpropane tetra (meth)acrylate, ethoxylated bisphenol A di(meth)acrylate, propoxylated bisphenol A di(meth)acrylate, ethoxylated hydrogenated bisphenol A di(meth)acrylate, propoxylated -modified hydrogenated bisphenol A di(meth)acrylate, ethoxylated bisphenol F di(meth)acrylate, or any combination thereof.

In one embodiment, the composition includes one or more components selected from the monofunctional ethylenically unsaturated components and the polyfunctional ethylenically unsaturated components. For example, the composition can include a monofunctional ethylenically unsaturated component and can include, as a crosslinker, a polyfunctional ethylenically unsaturated component. In an example, the crosslinker is present in an amount of 0.1 wt % to 2.0 wt %.

An exemplary diene elastomer is a copolymer formed from at least one diene monomer. For example, the diene elastomer can be a copolymer of ethylene, propylene and diene monomer (EPDM). An exemplary diene monomer includes a conjugated diene, such as butadiene, isoprene, chloroprene, or the like; a non-conjugated diene including from 5 to about 25 carbon atoms, such as 1,4-pentadiene, 1,4-hexadiene, 1,5-hexadiene, 2,5-dimethyl-1,5-hexadiene, 1,4-octadiene, or the like; a cyclic diene, such as cyclopentadiene, cyclohexadiene, cyclooctadiene, dicyclopentadiene, or the like; a vinyl cyclic ene, such as 1-vinyl-1-cyclopentene, 1-vinyl-1-cyclohexene, or the like; an alkylbicyclononadiene, such as 3-methylbicyclo-(4,2,1)-nona-3,7-diene, or the like; an indene, such as methyl tetrahydroindene, or the like; an alkenyl norbornene, such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadienyl)-2-norbornene, or the like; a tricyclodiene, such as 3-methyltricyclo $(5,2,1,0^2,6)$-deca-3,8-diene or the like; or any combination thereof. In a particular embodiment, the diene includes a non-conjugated diene. In another embodiment, the diene elastomer includes alkenyl norbornene. The diene elastomer can include, for example, ethylene from about 63 wt % to about 95 wt % of the polymer, propylene from about 5 wt % to about 37 wt %, and the diene monomer from about 0.2 wt % to about 15 wt %, based upon the total weight of the diene elastomer. In a particular example, the ethylene content is from about 70 wt % to about 90 wt %, propylene from about 17 wt % to about 31 wt %, and the diene monomer from about 2 wt % to about 10 wt % of the diene elastomer.

In a further example, the polymeric material of the polymer layer 106 includes include silicone. For example, the silicone can include polyalkylsiloxane with a functionalized terminal group. An exemplary polyalkylsiloxane is formed of a precursor, such as dimethylsiloxane, diethylsiloxane, dipropylsiloxane, methylethylsiloxane, methylpropylsiloxane, methylphenylsiloxane, fluorinated derivatives thereof, or any combination thereof. In a particular example, the polyalkylsiloxane can be terminated with an ethylenically unsaturated group, such as a vinyl terminal group. In another example, crosslinking agents including ethylenically unsaturated functionality, such as described above, can be used.

For a free-radical curable component, a free-radical photoinitiator can be present in the composition. An example of a free radical photoinitiator includes benzophenone (e.g., benzophenone, alkyl-substituted benzophenone, or alkoxy-substituted benzophenone); benzoin (e.g., benzoin, benzoin ethers, such as benzoin methyl ether, benzoin ethyl ether, and benzoin isopropyl ether, benzoin phenyl ether, and benzoin acetate); acetophenone, such as acetophenone, 2,2-dimethoxyacetophenone, 4-(phenylthio)acetophenone, and 1,1-dichloroacetophenone; benzil ketal, such as benzil dimethyl ketal, and benzil diethyl ketal; anthraquinone, such as 2-methylanthraquinone, 2-ethylanthraquinone, 2-tertbutylanthraquinone, 1-chloroanthraquinone, and 2-amylanthraquinone; triphenylphosphine; benzoylphosphine oxides, such as, for example, 2,4,6-trimethylbenzoyldiphenylphosphine oxide; thioxanthone or xanthone; acridine derivative; phenazene derivative; quinoxaline derivative; 1-phenyl-1,2-propanedione-2-O-benzoyloxime; 1-aminophenyl ketone or 1-hydroxyphenyl ketone, such as 1-hydroxycyclohexyl phenyl ketone, phenyl (1-hydroxyisopropyl)ketone and 4-isopropylphenyl(1-hydroxyisopropyl)ketone; a triazine compound, for example, 4'''-methyl thiophenyl-1-di(trichloromethyl)-3,5-S-triazine, S-triazine-2-(stilbene)-4,6-bistrichloromethyl, or paramethoxy styryl triazine; or any combination thereof.

An exemplary photoinitiator includes benzoin or its derivative such as α-methylbenzoin; U-phenylbenzoin; α-allylbenzoin; α-benzylbenzoin; benzoin ethers such as benzil dimethyl ketal (available, for example, under the trade designation "IRGACURE 651" from Ciba Specialty Chemicals), benzoin methyl ether, benzoin ethyl ether, benzoin n-butyl ether; acetophenone or its derivative, such as 2-hydroxy-2-methyl-1-phenyl-1-propanone (available, for example, under the trade designation "DAROCUR 1173" from Ciba Specialty Chemicals) and 1-hydroxycyclohexyl phenyl ketone (available, for example, under the trade designation "IRGACURE 184" from Ciba Specialty Chemicals); 2-methyl-1-[4-(methylthio)phenyl]-2-(4-morpholinyl)-1-propanone (available, for example, under the trade designation "IRGACURE 907" from Ciba Specialty Chemicals); 2-benzyl-2-(dimethlamino)-1-[4-(4-morpholinyl)phenyl]-1-butanone (available, for example, under the trade designation "IRGACURE 369" from Ciba Specialty Chemicals); or a blend thereof.

Another useful photoinitiator includes pivaloin ethyl ether, anisoin ethyl ether; anthraquinones, such as anthraquinone, 2-ethylanthraquinone, 1-chloroanthraquinone, 1,4-dimethylanthraquinone, 1-methoxyanthraquinone, benzanthraquinonehalomethyltriazines, and the like; benzophenone or its derivative; iodonium salt or sulfonium salt as described hereinabove; a titanium complex such as bis(η5-2,4-cyclopentadienyl)bis[2,-6-difluoro-3-(1H-pyrrolyl)phenyl]titanium (commercially available under the trade designation "CGI784DC", also from Ciba Specialty Chemicals); a halomethylnitrobenzene such as 4-bromomethylnitrobenzene and the like; mono- or bis-acylphosphine (available, for example, from Ciba Specialty Chemicals under the trade designations "IRGACURE 1700", "IRGACURE 1800", "IRGACURE 1850", and "DAROCUR 4265"); or any combination thereof. A suitable photoinitiator can include a blend of the above mentioned species, such as α-hydroxy ketone/acrylphosphin oxide blend (available, for example, under the trade designation IRGACURE 2022 from Ciba Specialty Chemicals.) A further suitable free radical photoinitiator includes an ionic dye-counter ion compound, which is capable of absorbing actinic rays and producing free radicals, which can initiate the polymerization of the acrylates.

Alternatively, a cationically polymerizable component, such as an epoxy component or an oxetane component, can be used. The epoxy component can include an aromatic epoxy-functional component ("aromatic epoxy"), an aliphatic epoxy-functional component ("aliphatic epoxy"), or a combination thereof. Epoxy-functional components are components comprising one or more epoxy groups, i.e., one or more three-member ring structures (oxiranes).

Aromatic epoxies components include one or more epoxy groups and one or more aromatic rings. The external phase can include one or more aromatic epoxy components. An example of an aromatic epoxy component includes an aromatic epoxy derived from a polyphenol, e.g., from bisphenols, such as bisphenol A (4,4'-isopropylidenediphenol), bisphenol F (bis[4-hydroxyphenyl]methane), bisphenol S (4,4'-sulfonyldiphenol), 4,4'-cyclohexylidenebisphenol, 4,4'-biphenol, or 4,4'-(9-fluorenylidene)diphenol. The bisphenol can be alkoxylated (e.g., ethoxylated or propoxylated) or halogenated (e.g., brominated). Examples of bisphenol epoxies include bisphenol diglycidyl ethers, such as diglycidyl ether of Bisphenol A or Bisphenol F.

A further example of an aromatic epoxy includes triphenylolmethane triglycidyl ether, 1,1,1-tris(p-hydroxyphenyl)ethane triglycidyl ether, or an aromatic epoxy derived from a monophenol, e.g., from resorcinol (for example, resorcin diglycidyl ether) or hydroquinone (for example, hydroquinone diglycidyl ether). Another example is nonylphenyl glycidyl ether.

In addition, an example of an aromatic epoxy includes epoxy novolac, for example, phenol epoxy novolac and cresol epoxy novolac. A commercial example of a cresol epoxy novolac includes, for example, EPICLON N-660, N-665, N-667, N-670, N-673, N-680, N-690, or N-695, manufactured by Dainippon Ink and Chemicals, Inc. An example of a phenol epoxy novolac includes, for example, EPICLON N-740, N-770, N-775, or N-865, manufactured by Dainippon Ink and Chemicals Inc.

Aliphatic epoxy components have one or more epoxy groups and are free of aromatic rings. The external phase can include one or more aliphatic epoxies. An example of an aliphatic epoxy includes glycidyl ether of C2-C30 alkyl; 1,2 epoxy of C3-C30 alkyl; mono or multi glycidyl ether of an aliphatic alcohol or polyol such as 1,4-butanediol, neopentyl glycol, cyclohexane dimethanol, dibromo neopentyl glycol, trimethylol propane, polytetramethylene oxide, polyethylene oxide, polypropylene oxide, glycerol, and alkoxylated aliphatic alcohols; or polyols.

In one embodiment, the aliphatic epoxy includes one or more cycloaliphatic ring structures. For example, the aliphatic epoxy can have one or more cyclohexene oxide structures, for example, two cyclohexene oxide structures. An example of an aliphatic epoxy comprising a ring structure includes hydrogenated bisphenol A diglycidyl ether, hydrogenated bisphenol F diglycidyl ether, hydrogenated bisphenol S diglycidyl ether, bis(4-hydroxycyclohexyl)methane diglycidyl ether, 2,2-bis(4-hydroxycyclohexyl)propane diglycidyl ether, 3,4-epoxycyclohexylmethyl-3,4-epoxycyclohexanecarboxylate, 3,4-epoxy-6-methylcyclohexylmethyl-3,4-epoxy-6-methylcyclohexanecarboxylate, di(3,4-epoxycyclohexylmethyl)hexanedioate, di(3,4-epoxy-6-methylcyclohexylmethyl)hexanedioate, ethylenebis(3,4-epoxycyclohexanecarboxylate), ethanedioldi(3,4-epoxycyclohexylmethyl) ether, 2-(3,4-epoxycyclohexyl-5,5-spiro-3,4-epoxy)cyclohexane-1,3-dioxane; or any combination thereof.

The polymer composition can include one or more oxetane-functional components ("oxetanes"). Oxetanes are components having one or more oxetane groups, i.e., one or more four-member ring structures including one oxygen and three carbon members.

The composition can also include a cationic photoinitiator that forms active species that, if exposed to actinic radiation, are capable of at least partially polymerizing epoxides or oxetanes. For example, a cationic photoinitiator may, upon exposure to actinic radiation, form cations that can initiate the reactions of cationically polymerizable components, such as epoxies or oxetanes. An example of a cationic photoinitiator includes, for example, onium salt with anions of weak nucleophilicity. An example includes a halonium salt, an iodosyl salt or a sulfonium salt, a sulfoxonium salt, or a diazonium salt. Other examples of cationic photoinitiators include metallocene salt.

In a particular example, a photoinitiator (free-radical or cationic) can be present in an amount not greater than about 20 wt %, for example, not greater than about 10 wt %, and typically not greater than about 5 wt %, based on the total weight of the composition. In an example, the photoinitiator can be present in an amount of 0.1 wt % to 3.0 wt %, such as 0.5 wt % to 3.0 wt %. In another example, a photoinitiator can be present in an amount of 0.1 wt % to 1.1 wt %, such as 0.1 wt % to 0.8 wt %, 0.1 wt % to 0.6 wt %, or 0.2 wt % to 0.5 wt %, based on the total weight of the composition, although amounts outside of these ranges can also be useful. The composition including filler, surfactant, coupling agent, plasticizer, or any combination thereof.

Returning to FIG. 1, the polymer layer 106 can have a surface 110 in contact with an intermediate layer 104, as illustrated, or in direct contact with a substrate 102 without an intermediate layer. An opposite surface 108 includes microfeatures, such as undulations having peaks and valleys. In an example, the undulations have an average wavelength ($\lambda$), measured peak-to-peak across a valley, in a range of 25 micrometers to 500 micrometers, such as a range of 40 micrometers to 500 micrometers, a range of 50 micrometers to 300 micrometers, a range of 70 micrometers to 240 micrometers. In a particular example, the average wavelength is in a range of 150 mircometers to 240 micrometers. In another example, the average wavelength is in a range of 60 micrometers to 145 micrometers. In a particular example, the microfeatures can have a wavelength ratio, defined as the ratio of the average wavelength to the coating thickness, in a range of 0.4 to 0.8, such as a range of 0.45 to 0.75, or a range of 0.5 to 0.7.

In a further example, the microfeatures can have an average amplitude (A), measured peak to adjacent valley, in a range of 1 micrometer to 60 micrometers, such as a range of 5 micrometers to 40 micrometers, a range of 10 micrometers to 40 micrometers, or a range of 15 micrometers to 40 micrometers. In a particular example, the microfeatures have an amplitude ratio, defined as the ratio of average amplitude to coating thickness, in a range of 0.05 to 0.50, such as a range of 0.05 to 0.5, a range of 0.05 to 0.30, a range of 0.08 to 0.27, a range of 0.10 to 0.27, or even a range of 0.12 to 0.25.

The polymer layer 106 can have a thickness (t) in a range of 50 micrometers to 1 mm. For example, the polymer layer 106 can have a thickness in a range of 100 micrometers to 500 micrometers, such as a range of 100 micrometers to 400 micrometers. In an example, the thickness can be in a range of 250 micrometers to 400 micrometers. In another example, the thickness can be in a range of 120 micrometers to 245 micrometers.

In an embodiment, an article is formed by coating a composition on a substrate. The composition can be coated to directly contact the substrate without intermediate layers. Alternatively, intermediate layers can be applied on the substrate to lie between the composition and the substrate. Following coating, the composition can be cured using radiation, such as actinic radiation, in the presence of oxygen. For example, the composition can be cured using ultraviolet radiation.

Oxygen can be available as part of a surrounding atmosphere or by an oxygen-containing overlay. For example, the composition can be cured while in contact with an atmosphere including oxygen. In an example, the atmosphere can include oxygen in a range of 1 vol % to 37 vol %, such as 1 vol % to 25 vol %, 5 vol % to 20 vol %, or 5 vol % to 17 vol %. In particular, the atmosphere can be controlled to include the desired level of oxygen and an inert gas, such as nitrogen or a noble gas. The atmosphere can be free of humidity. In another example, the atmosphere can be free of other reactive gases.

Figure 2:
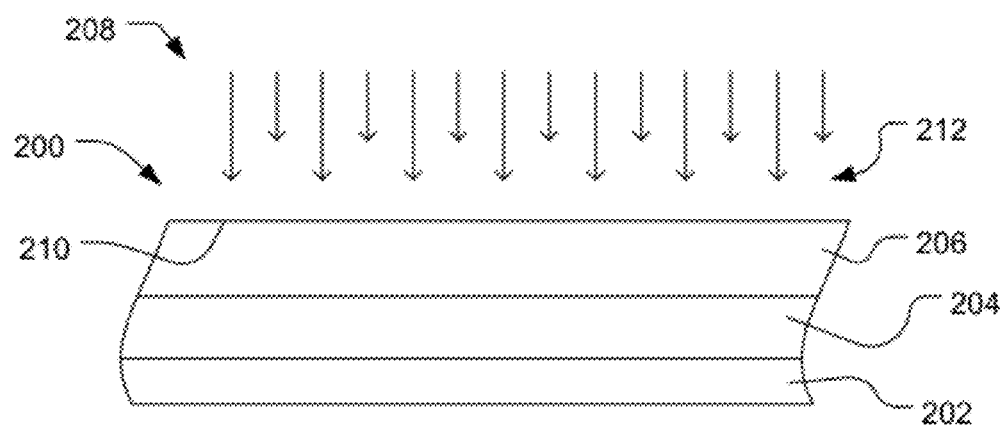
FIG. 2 includes an illustration of an exemplary intermediate product.

For example, as illustrated in FIG. 2, an intermediate product 200 includes a substrate 202 coated with an uncured polymer layer 206 and optionally, an intermediate layer 204 disposed between the substrate 202 and the uncured polymer layer 206. The surface 210 of the polymeric layer 206 is exposed to actinic radiation 208 in the presence of an atmosphere 212. As a result of curing in the presence of the oxygen-containing atmosphere 212, microfeatures form, such as those described above in relation to FIG. 1. The substrate 202 or intermediate layer 204 can be formed as described above in relation to the substrate 102 or intermediate layer 104 of FIG. 1.

The uncured polymer layer 206 can include an uncured composition including the components described above in relation to the polymer layer 106 of FIG. 1. The uncured composition can be coated to a thickness in a range of 50 micrometers to 1 mm. For example, the uncured polymer layer 206 can have a thickness in a range of 100 micrometers to 500 micrometers, such as a range of 100 micrometers to 400 micrometers. In an example, the thickness can be in a range of 250 micrometers to 400 micrometers. In another example, the thickness can be in a range of 120 micrometers to 245 micrometers.

Figure 3:
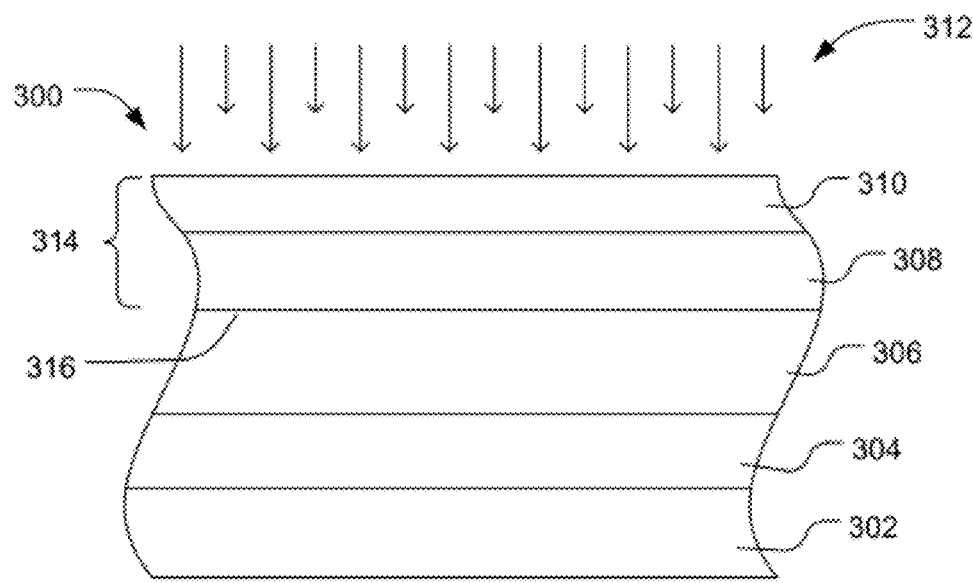
FIG. 3 and FIG. 4 include illustrations of exemplary intermediate products.

In another example, the oxygen can be supplied by an oxygen-containing overlay. For example, as illustrated in FIG. 3, an intermediate product 300 includes a substrate 302 coated with an uncured polymer layer 306. Optionally, one or more intermediate layers 304 can be disposed between the substrate 302 and the uncured polymer layer 306. The substrate 302, the intermediate layer 304, or the uncured polymer layer 306 can be formed as described above in relation to FIG. 1 and FIG. 2. In particular, the uncured polymer layer 306 can have a thickness described above in relation to FIG. 2.

An oxygen-containing overlay 314 is placed in contact with a surface 316 of the uncured polymer layer 306. The oxygen-containing overlay 314 is transparent to the radiation useful for curing the uncured polymer layer 306. In a particular example, the oxygen-containing overlay 314 can include an oxygen-containing layer 308 and a support 310. For example, the oxygen-containing layer 308 can include a porous elastomer. In an example, the porous elastomer includes a fluoroelastomer, a silicone elastomer, or a combination thereof. In particular, the porous elastomer includes a silicone elastomer. Oxygen can be infused or dissolved in the porous elastomer to form the oxygen containing layer 308. In a particular example, the porous elastomer can be infused with oxygen from a pure oxygen source. Alternatively, the porous elastomer can be infused with oxygen from a mixture of gasses, such as those described above in relation to the atmosphere 212 of FIG. 2.

The support 310 includes a rigid material and is transparent to radiation 312. For example, the support 310 can include a rigid polymer or can include an inorganic material, such as silicate glass, borosilicate glass, sapphire, or any combination thereof.

Upon curing, the polymer layers (206 or 306) form surface microfeatures. When an overlay is used, the overlay is removed after curing. Such microfeatures can have the morphology, including average wavelength or average amplitude, as described above in relation to FIG. 1.

In another embodiment, a patterned barrier layer can be disposed between the oxygen source and the coated composition. In particular, the patterned barrier layer forms portions that slow oxygen diffusion while leaving other portions unencumbered to oxygen diffusion. Such patterned barrier layers can be formed of ceramics resistive to oxygen diffusion.

In an example, the patterned barrier layer can form a set of pads. The pads can be formed of material that forms a barrier to oxygen. The region around the pads can permit diffusion of oxygen to the uncured polymer layer. In an example, the pads can be circular. In another example, the pads can be polygonal, for example, having at least 3 sides, such as at least 4 sides, at least 6 sides or even at least 8 sides. In an alternative embodiment, the pads can permit oxygen diffusion and the regions surrounding the pads limit oxygen transfer.

Figure 4:
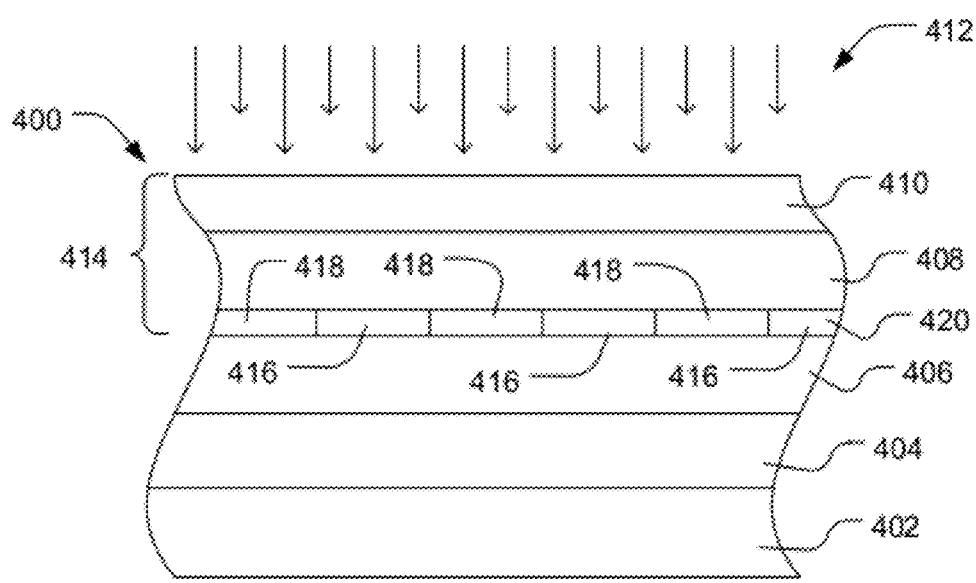

In an example, such a patterned barrier layer can be applied directly to the uncured polymer layer and the patterned barrier layer and the uncured polymer layer exposed to radiation in the presence of an oxygen atmosphere. In another example illustrated in FIG. 4, a barrier layer 420 can be applied between an uncured polymer layer 406 and an oxygen-containing layer 408. For example, a substrate 402 can be coated with an uncured polymer layer 406. The uncured polymer layer 406 can have the composition and thickness described above. Optionally, an intermediate layer 404 can be disposed between the substrate 402 and the uncured polymer layer 406.

An oxygen-containing overlay 414 can be applied on the uncured polymer layer 406. The oxygen-containing overlay 414 can include a support 410 and an oxygen-containing layer 408, for example, as described above. A patterned barrier layer 420 can be disposed on a surface of the oxygen-containing layer 408 to be disposed between the oxygen-containing layer 408 and the uncured polymer layer 406. The patterned barrier layer 420 can include portions 416 that limit oxygen transfer and can include portions 418 that permit oxygen transfer. In a particular example, the portions 416 can be surrounded by the portions 418 when viewed from a plan view. Alternatively, the portions 416 can surround the portions 418 when viewed from a plan view. In a further example, the portions 416 and 418 can be intertwined to form a variety of patterns.

The patterned barrier layer 420 can include materials that are transparent to the radiation 412 useful in curing the uncured polymer layer 406. In an example, the portions 416 that limit oxygen transfer or diffusion can be formed of transparent ceramic materials. In an example, the oxygen-containing layer 408 can be formed of a silicone elastomer and the portions 416 can be formed of a silicate material. For example, the silicate material can be formed by exposing the silicone elastomer to ultraviolet radiation through a mask in the presence of ozone. In such an example, the portions 418 are either free space or are formed of the silicone elastomer. Alternatively, barrier layers can be formed by deposition of metal or ceramic layers through sputtering or chemical vapor deposition.

Figure 5:
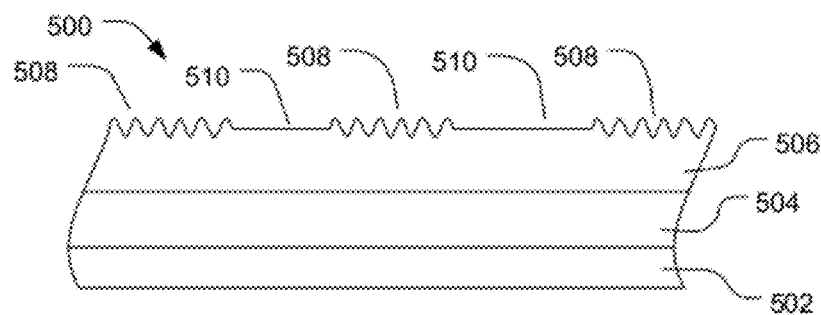
FIG. 5 includes an illustration of an exemplary article.

Upon curing, a surface is formed that includes portions without microfeatures and portions with microfeatures. For example, as illustrated in FIG. 5, an article 500 includes a polymer layer 506 on a substrate 502. Optionally, one or more intermediate layers 504 are disposed between the substrate 502 and the polymer layer 506. The polymer layer 506 includes portions 508 that include microfeatures, such as those described above in relation to FIG. 1, and includes portions 510 that are free of microfeatures. For example, the portions 510 can be relatively smooth. The microfeatures appear in relation to portions 508 that are exposed to oxygen and the smooth portions 510 appear in relation to portions associated with oxygen barriers. In particular, the portions 510 can have a roughness (Ra) of not greater than 1 micrometer, such as not greater than 500 nm, or not greater than 100 nm.

While the illustrated polymer layers (FIGS. 1-5) are formed on a flat substrate, the polymer layer can be formed on a curved substrate. In a particular example, curing on a curved surface can lead to the formation of a microlens array.

In a particular example, when the barrier layer includes pads of barrier material surrounded by portions that permit oxygen transfer, the resulting surface includes microfeatures surrounding relatively smooth surface regions. Such surface features find particular promise as microlenses. In particular, the microfeatures when surrounding a smooth region of particular size buckle the smooth region to form microlenses. In an example the microlenses have a radius of curvature ($\lambda^2/A$) in a range of 150 micrometers to 2000 micrometers, such as a range of 150 micrometers to 1000 micrometers, a range of 150 micrometers to 500 micrometers. In another example, the microlens can have a diameter in a range of 1 micrometers to 500 micrometers, such as 2 micrometers to 250 micrometers, or 2 micrometers to 100 micrometers.

Articles including a polymer layer having the microfeatures described above in relation to FIGS. 1-5 are useful in various industries and products. For example, such articles find use in the electronics industry, the photovoltaic industry, the coated abrasives industry, and the adhesives industry. In an example, the polymer layer including the microlayers can be separated from the substrate with or without intermediate layers and used to form a product. In another example, the article including the substrate and the polymer layer can be used to form the product.

In a particular example, a polymer layer including a surface having microfeatures can be used as a cover film over an electronic device or a photovoltaic device. The microfeatures can be uniformly distributed along the surface or can be patterned. In a particular example, the microfeatures form microlenses. Such microfeatures can exhibit optical properties that are useful in photovoltaic and visual display applications.

Figure 6:
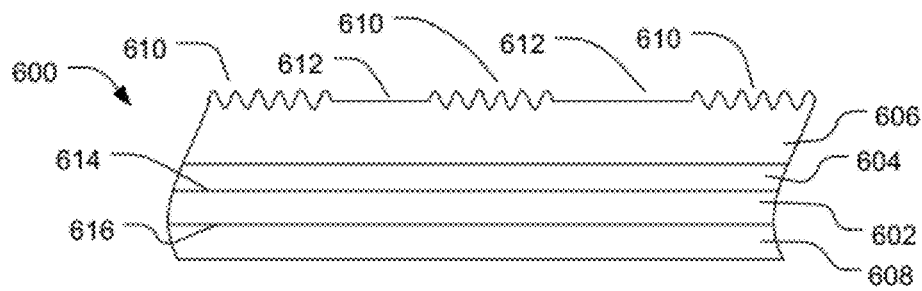
FIG. 6 includes an illustration of an exemplary photovoltaic system.

For example, FIG. 6 includes an illustration of an exemplary photovoltaic device 600. The photovoltaic device 600 includes a photovoltaic component 602 having a front surface 614 and a back surface 616. The front surface 614 can include an active layer that converts light into current. A polymeric layer 606 having a surface with microfeatures is disposed over the photovoltaic component 602. Optionally, an intermediate layer or an encapsulant layer 604 can be included between the polymeric layer 606 and the photovoltaic component 602. One or more backside layers 608 can be disposed on the back surface 616.

In the illustrated example, the photovoltaic device 600 includes smooth regions 612 surrounded by regions 610 with microfeatures when viewed from a plan view. In a particular example, the smooth regions 612 can buckle to form microlenses.

In a further example, the polymer layer can be useful in electronic devices, particularly with electronic devices having a visual display. For example, an electronic device can be substituted for the photovoltaic component 602 in a similar structure to that described in FIG. 6. In particular, a visual display surface can for a front surface, such as surface 614. The electronic device can include electronics and input devices to control the visual display.

Figure 7:
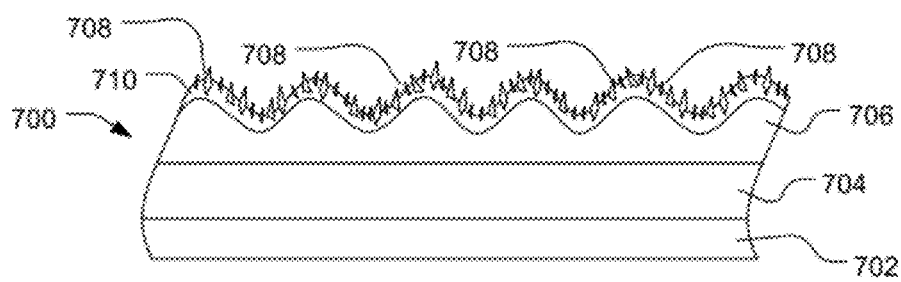
FIG. 7 includes an illustration of an exemplary coated abrasive article.

In another example, a polymer layer including a surface having microfeatures can be used as a substrate for coated abrasive article. For example, FIG. 7 includes an illustration of an exemplary coated abrasive article 700. In an example, the coated abrasive article 700 includes a substrate 702 and a polymer layer 706 that has surface microfeatures. Optionally, one or more intermediate layers 704 can be disposed between the polymer layer 706 and the substrate 702.

The polymer layer 706 can be coated with a binder 710 and abrasive grains 708 to form an abrasive surface of the abrasive article 700. Optionally, additional layers (not illustrated) can be disposed over the binder 710 and abrasive grains 708.

Figure 8:
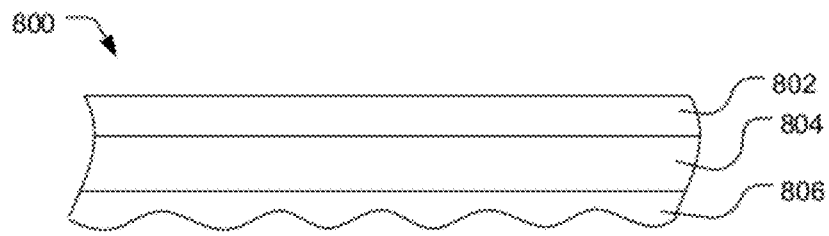
FIG. 8 includes an illustration of an exemplary adhesive backed article.

In a further example, a polymer layer including a surface having microfeatures can be used as an adhesive layer. For example, FIG. 8 includes an illustration of an exemplary article 800 having an adhesive backing 806. In an example, the article 800 includes one or more layers 802 or 804. The layers 802 or 804 can be polymeric or inorganic or can be a device or component.

Embodiments of the above process provide particular technical advantages. During UV-curing of polymer resin films in presence of oxygen, a thin liquid layer of un-polymerized monomers is present on top of the underlying cured film throughout the UV-curing time due to quenching of free radicals by oxygen. The oxygen-inhibited, uncured liquid layer on top of underlying crosslinked film generates swelling induced surface wrinkle patterns with well-controlled dimensions in a single fabrication step. The oxygen can either be present in the atmosphere surrounding the curing film or can be provided through a porous, oxygen-containing solid in contact with the curing film. By controlling the amount and spatial distribution of oxygen in contact with the curing film, the wrinkle amplitude and spatial patterning of wrinkles can be controlled.

EXAMPLES

Example 1

A liquid resin formulation is prepared by mixing monomers (2-phenoxyethyl acrylate, Sigma-Aldrich) with crosslinker (1,6-hexanediol diacrylate, Sigma-Aldrich) and photoinitiator (Irgacure-184, Ciba Specialty Chemicals) in desired ratios. A measured volume of resin formulation is dispensed on a glass slide (cleaned by exposing to UV-ozone for 30 minutes) and is allowed to spread to a diameter of 20 mm to obtain liquid resin films of desired thickness. The deposited liquid films are then exposed to a 365 nm UV source (21 mW/cm$^2$) for 60 s. During UV-exposure, the curing film is either exposed to (a) a controlled mixture of oxygen and nitrogen (including air and pure nitrogen) (FIG. 2) or (b) covered with a porous, transparent, oxygen-containing solid (crosslinked poly-dimethyl siloxane—PDMS) backed by a glass slide (FIG. 3). Morphological characterization of the wrinkles (undulations) is determined by optical microscope and 3D optical profilometer (Zygo New View 6000 3D, Zygo Corporation).

During UV-curing of polymer resin films in the presence of oxygen, a thin liquid layer of un-polymerized monomers is present on top of the underlying cured film throughout the UV-curing time, due to quenching of free radicals by oxygen. It is believed that, after finishing UV-exposure, the thin liquid layer of monomers swells the underlying cured film and causes wrinkling. When the UV-curing is carried out in absence of oxygen, either by curing in nitrogen environment or by covering the resin film by glass slide during UV-exposure to cut-off atmospheric oxygen, no wrinkles are observed, confirming the role of oxygen in wrinkle formation. The absence of wrinkling in the case of UV-curing in a nitrogen environment also rules out depth-wise gradient of UV-curing as the reason for wrinkling.

Figure 10:
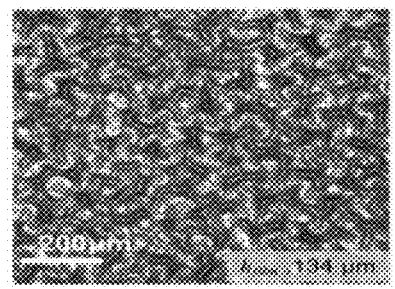
FIG. 10, FIG. 11, and FIG. 12 include illustrations of undulating surface features.
Figure 11:
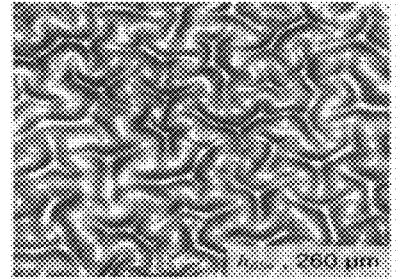
Figure 12:
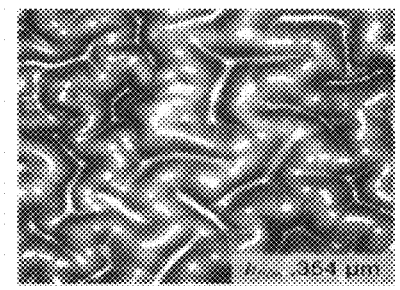

As illustrated in FIG. 10, FIG. 11, and FIG. 12, surface microfeatures form as a result of curing in the presence of oxygen. FIG. 10 includes an illustration of microfeatures formed on a polymer layer formed from a 134 micrometer thick coating of the above formulation. FIG. 11 includes an illustration of microfeatures formed on a polymer layer formed from a 260 micrometer thick coating of the above formulation, and FIG. 12 includes an illustration of microfeatures formed on a polymer layer formed from a 354 micrometer thick coating of the above formulation.

Figure 9:
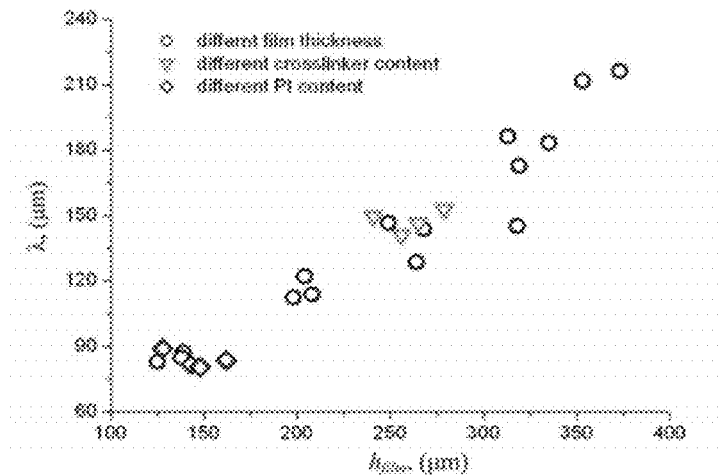
FIG. 9 includes a graph illustration of the relationship between surface feature wavelength and film thickness.
Figure 15:
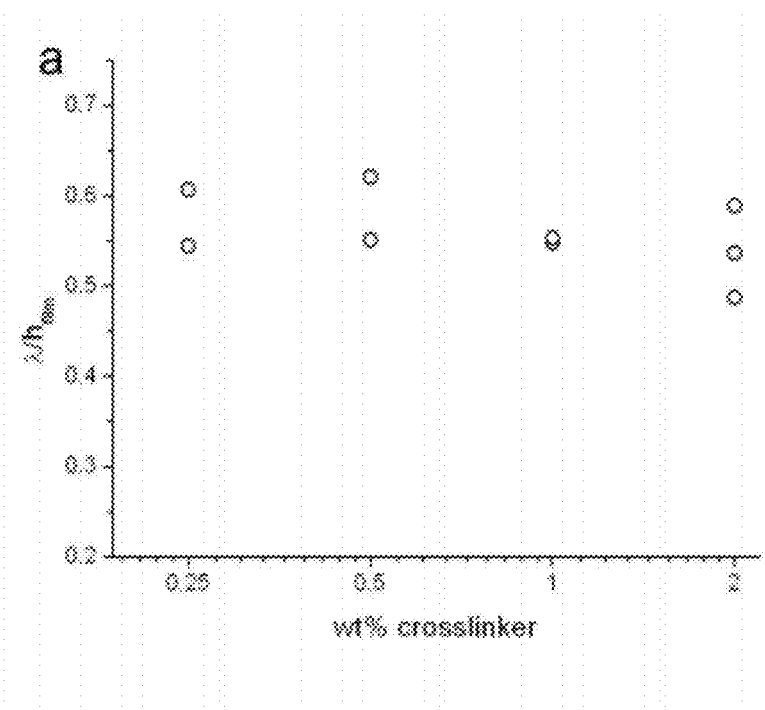
FIG. 15 includes a graph illustration of the relationship between crosslinker concentration and surface feature wavelength.
Figure 16:
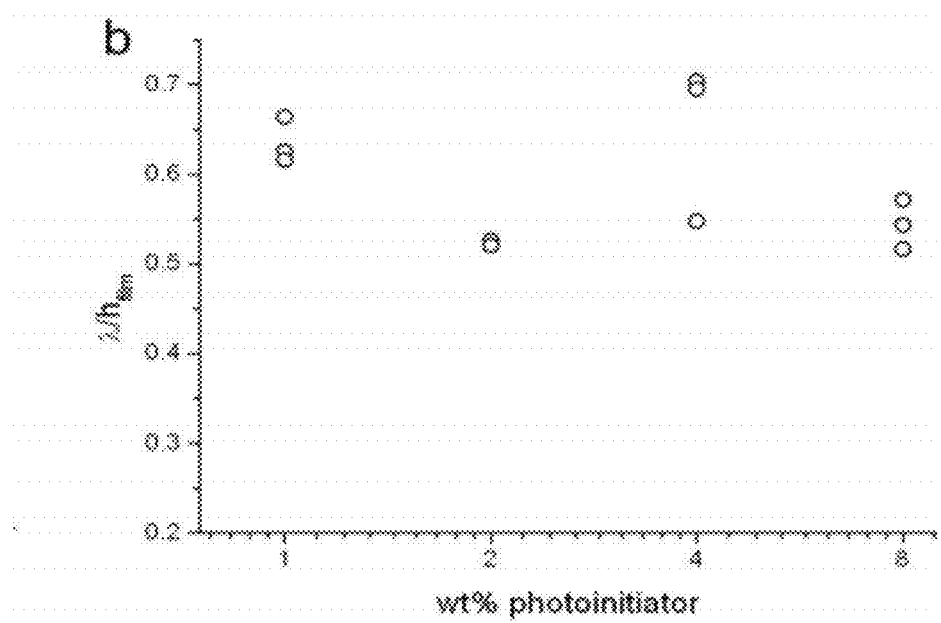
FIG. 16 includes a graph illustration of the relationship between photoinitiator concentration and surface feature wavelength.

As illustrated in FIG. 9, the average wavelength ($\lambda$) of the swelling induced wrinkles exhibits a linear relationship with film thickness for a range of different films. Changing the amount of crosslinker (FIG. 15) or photoinitiator content (FIG. 16) does not appear to affect the wavelength.

Figure 13:
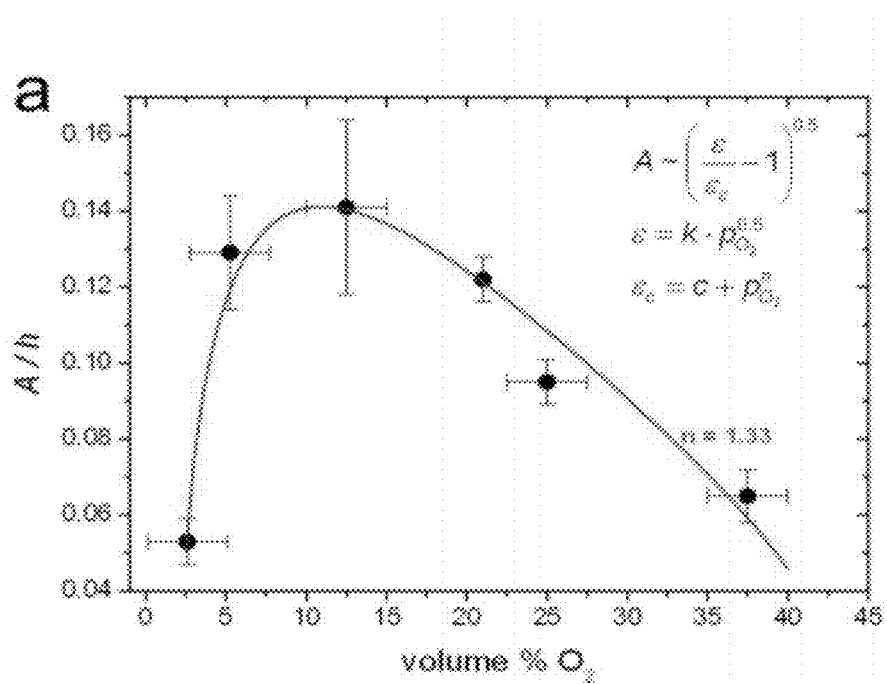
FIG. 13 includes a graph illustration of the relationship between atmospheric oxygen content and surface feature amplitude.
Figure 14:
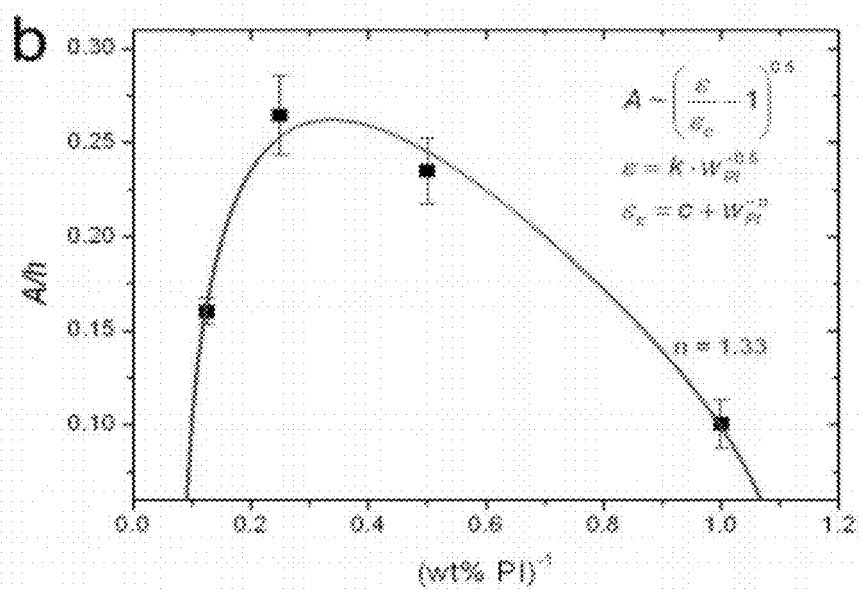
FIG. 14 includes a graph illustration of the relationship between photoinitiator concentration and surface feature amplitude.

In such systems, the amplitude of the wrinkles (undulations) increases with increasing compressive strain. The compressive strain, $\epsilon$ appears to be directly proportional to the amount of swelling liquid present. The thickness of the swelling liquid layer scales with the partial pressure of oxygen in contact with the curing film. Thus, the amplitude can be tuned by controlling the amount of oxygen present in the atmosphere surrounding the curing film. To demonstrate, UV-curing in a gas-flow chamber in which oxygen and nitrogen gases are introduced at controlled rates keeping the total flow rate constant is performed. As illustrated in FIG. 13, the normalized wrinkle amplitude, $A/h_{film}$ ($h_{film}$ is the total coating thickness) initially increases sharply with increasing oxygen concentration due to increase in the uncured liquid layer and thus, increase in strain $\epsilon$. However, at high oxygen concentration the amplitude gradually decreases with increasing oxygen concentration. As the oxygen concentration is increased, in addition to increase in $\epsilon$, the cross-linking density (and hence modulus) of the bottom cross-linked film also decreases due to increased inhibition of polymerization. Thus, the resulting softer film can absorb more liquid before wrinkling (i.e., the critical wrinkling strain, $\epsilon_c$ also increases with increasing oxygen concentration). Such softening results in a decrease in amplitude at high oxygen concentration. Since, in free-radical polymerization, an increase in oxygen concentration is analogous to a decrease in photo-initiator concentration, a similar relation between amplitude and photo-initiator concentration is observed, as illustrated in FIG. 14.

Example 2

A sample is formed using an oxygen-containing overlay. The overlay is placed over the coated formulation and the coated formulation is exposed to UV radiation as described in EXAMPLE 1. The overlay is removed after curing.

Figure 17:
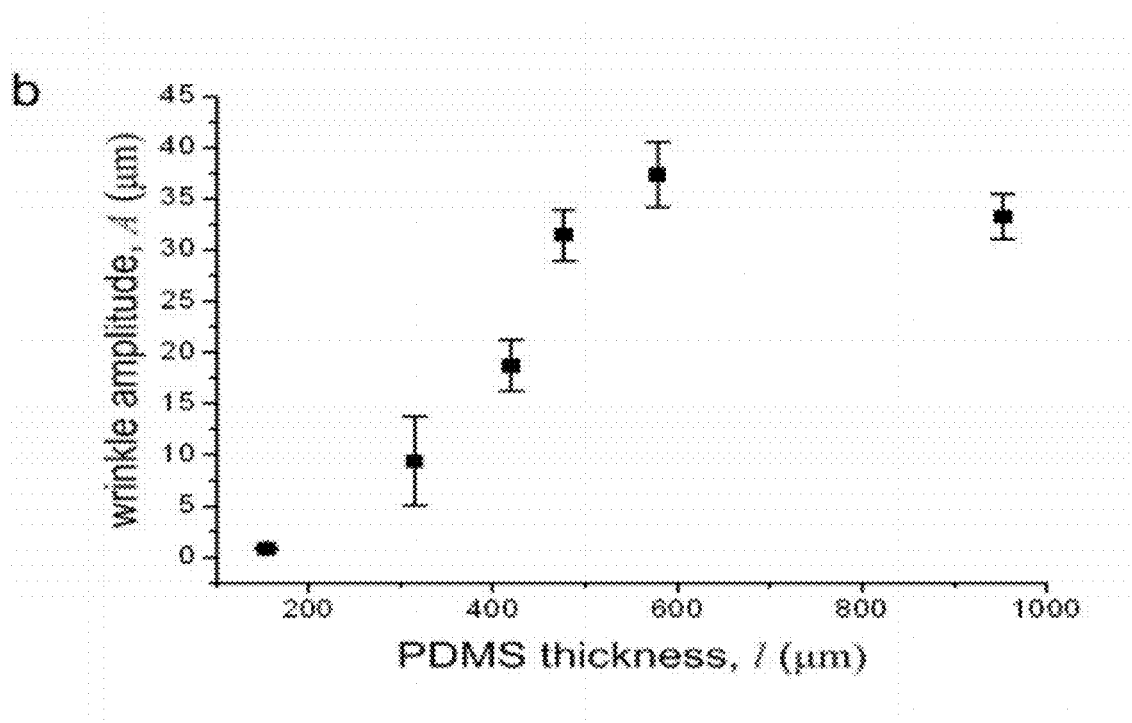
FIG. 17 includes a graph illustration of the relationship between oxygen-containing overlay thickness and surface feature amplitude.

The amount of oxygen in contact with the curing film is controlled by covering the liquid resin films with PDMS membranes (porous elastomer with oxygen dissolved in it) of different thicknesses backed by a glass-slide during UV-exposure. As the thickness of the PDMS membrane is increased, more oxygen is available in contact with the curing film, resulting in increased wrinkle amplitude as illustrated in FIG. 17.

Example 3

Samples are prepared as described in EXAMPLE 2 with the addition of a patterned barrier layer. To fabricate patterned wrinkles, during UV-exposure, the liquid resin film is covered with a glass-backed polydimethylsiloxane (PDMS) membrane, which has a patterned silicate layer on the surface in contact with liquid resin film. The patterned silicate layer is grown on the PDMS surface by exposing the PDMS membrane to UV-ozone for 45 minutes through a stencil mask. Morphological characterization of the wrinkles (undulations) is determined by optical microscope and 3D optical profilometer (Zygo New View 6000 3D, Zygo Corporation).

Figure 18:
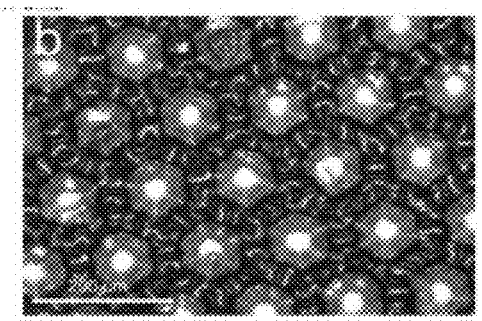
FIG. 18 and FIG. 19 include plan view illustrations of polymer constructions that include patterned surface features.

The silicate layer acts as a barrier to oxygen diffusion into the curing film, preventing wrinkle formation in selected areas. FIG. 18 illustrates patterns of wrinkles by spatial patterning of oxygen diffusion into the liquid films.

Due to stresses generated by the surrounding wrinkled area, the non-wrinkled areas in FIG. 18 buckle out of the plane to form microlenses. The dimension of the microlenses is related to the dimensions of the stencil mask used and can be on order of a few microns to a few hundred microns. For example, the microlenses can have a diameter of 2 micrometers to 300 micrometers.

Figure 19:
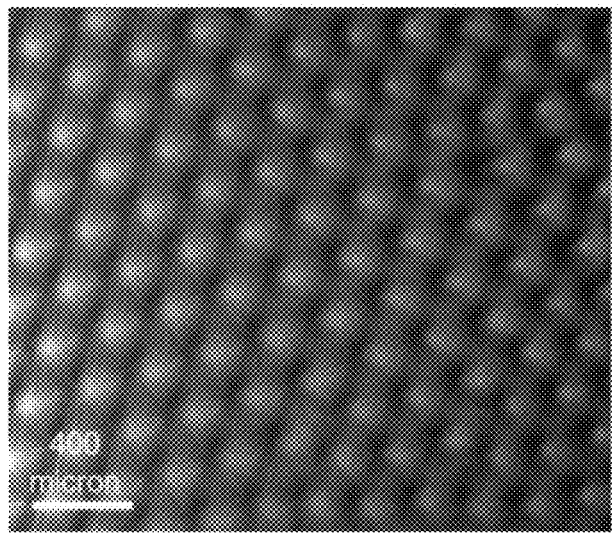

In addition to patterning, ordered arrays of microlenses can be spontaneously formed by carrying out the curing process in a curved geometry. When the resin is UV-cured in spherical-cap geometry (diameter~cm), highly ordered microlenses (diameter~100 µm) spontaneously form on the curved surface (FIG. 19), thereby realizing a compound microlens array in a single fabrication step. The dimension of the individual microlenses is determined by the wavelength of the system and thus, can in principle be as small as a few tens of microns.

Note that not all of the activities described above in the general description or the examples are required, that a portion of a specific activity may not be required, and that one or more further activities may be performed in addition to those described. Still further, the orders in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of forming a polymer film, the method comprising:
dispensing a substrate;
coating the substrate with a composition that is curable using actinic radiation;

applying a patterned barrier layer over the composition, wherein the patterned barrier layer forms portions that slow oxygen diffusion and other portions unencumbered to oxygen diffusion; and exposing the composition to actinic radiation in presence of an atmosphere including 1 vol % to 37 vol % oxygen, whereby the surface of the composition forms an undulating morphology.

2. The method of claim 1, wherein exposing the composition to actinic radiation includes exposing the composition to UV-radiation.

3. The method of claim 1, wherein the composition includes a momomer, a pre-polymer, or a polymer precursor including an acrylate, an isocyanate with acrylate functionality, an isocyanurate with acrylate functionality, a silicone, a diene elastomer, an epoxy, an oxetane, or any combination thereof.

4. The method of claim 1, wherein the composition includes a free-radical curable momomer, pre-polymer, or a polymer precursor.

5. The method of claim 1, wherein the composition includes an acrylate.

6. The method of claim 1, wherein the composition includes 0.1 wt % to 3.0 wt % photoinitiator.

7. The method of claim 1, wherein the undulating morphology has an average wavelength in a range of 40 micrometers to 500 micrometers.

8. The method of claim 1, wherein the undulating morphology has a wavelength ratio in a range of 0.4 to 0.8.

9. The method of claim 1, wherein the undulating morphology has an average amplitude in a range of 1 micrometer to 60 micrometers.

10. The method of claim 1, wherein the undulating morphology has an amplitude ratio in a range of 0.05 to 0.50.

11. The method of claim 1, wherein coating includes coating to a thickness in a range of 50 micrometers to 1 mm.

12. The method of claim 1, wherein the atmosphere includes 5 vol % to 17 vol % oxygen.

* * * * *